United States Patent
Wang

(10) Patent No.: US 8,038,161 B2
(45) Date of Patent: Oct. 18, 2011

(54) FOLDING STRUCTURE FOR CARRIER'S HANDLEBAR

(76) Inventor: Arthur Wang, Gangshan Township, Kaohsiung County (TW)

( * ) Notice: Subject to any disclaimer, the term of this patent is extended or adjusted under 35 U.S.C. 154(b) by 722 days.

(21) Appl. No.: 12/078,492

(22) Filed: Apr. 1, 2008

(65) Prior Publication Data

US 2009/0241723 A1    Oct. 1, 2009

(51) Int. Cl.
*B62M 1/00* (2010.01)
(52) U.S. Cl. .............. 280/87.051; 280/87.041
(58) Field of Classification Search .... 280/87.01–87.05, 280/641, 642, 42, 647, 650
See application file for complete search history.

(56) References Cited

U.S. PATENT DOCUMENTS

| | | | |
|---|---|---|---|
| 4,834,403 A * | 5/1989 | Yanus et al. | 280/30 |
| 6,428,021 B1 * | 8/2002 | Tung | 280/87.041 |
| 6,910,708 B2 * | 6/2005 | Sack et al. | 280/642 |
| 7,011,319 B2 * | 3/2006 | Lu | 280/87.041 |
| 2007/0228696 A1 * | 10/2007 | Pike et al. | 280/642 |

* cited by examiner

*Primary Examiner* — J. Allen Shriver, II
*Assistant Examiner* — Katy Meyer
(74) *Attorney, Agent, or Firm* — Rosenberg, Klein & Lee

(57) ABSTRACT

This invention relates to a folding structure for carrier's handlebar, wherein it essentially comprises: a first joint (2) fixed in the front end of a carrier body (1) and having positioning teeth (25) formed on the sidewall in the interior thereof, and a second joint (3) pivotally provided in the first joint (2); a rail block (33) being fixed in the interior of the second joint (3), the rail block (33) being formed with a sliding rail (331), a slider (34) being formed in the sliding rail (331), occluding teeth (341) being formed on the bottom end of the slider (34) to mesh with the positioning teeth (25) of the first joint (2), a wire body (35) and an elastic member (36) being provided on the top end of the slider (34), and a dragon head handlebar (12) being provided on the second joint (3). In this manner, it is convenient for user to adjust the angle of the dragon head handlebar. In addition, the elastic member enables the slider to mesh automatically with the positioning teeth so as to ensure the safety of user.

5 Claims, 8 Drawing Sheets

FOLDING STRUCTURE FOR CARRIER'S HANDLEBAR

BACKGROUND OF THE INVENTION

1. Field of the Invention

The present invention relates to a folding structure for carrier's handlebar, particularly to a folding structure for carrier's handlebar in which the movability of the second joint is controlled by whether the occluding teeth on the bottom end of the slider mesh with the positioning teeth of the first joint or not. In this manner, it is convenient for user to adjust the angle of the dragon head handlebar.

2. Brief Description of the Prior Art

Environmental consciousness has been upsurging due to both the soaring high of global oil price and climate abnormality caused by green house effect, thus green energy is becoming the hot issue which attracts close attention from all over the world. Accordingly, the so-called "green transportation revolution" triggered by the manual scooter is spreaded all over the world. After understanding the importance of developing the green transportation, government of each country begins to increase the construction of new bikeway, road or relevant public facilities. Inasmuch as the manual scooter is easy to operate by consumer and can satisfy on-time demand of consumer, the manual scooter industry is no doubt a prospective potential business meeting the requirement of environment protection and energy saving as well as the new momentum of continuing growth for scooter industry. The reasons why consumer will choose manual scooter as the traffic means includes: cheapness on sale price and running cost, solution for parking difficulty and traffic jamming, best solution for LOHAS without car-driving which usually uses petroleum fuel and cause air and noise pollution problem. Therefore, the manual scooter termed as "pioneer of green transportation era" will become the most prospective star industry of tomorrow. According to demand and function, the manual scooter can be divided into: scooter of special purpose carrier for leisure time and industrial use, scooter for vulnerable age people, and scooter of middle and short travel distance for metropolitan.

Most of the abovementioned scooter are provided with a dragon head adjustment structure by which user can adjust the dragon head of the scooter for easy operation and contraction. The dragon head is composed of an upper stem, a lower stem and a trigger, in which the upper stem is provided with a through hole and a fixing hole, the upper end of the lower stem being provided with a receiving frame having an adjusting hole with arc curve shape and a positioning hole being formed at the lower side of the adjusting hole; a spindle having a thread and being in thread engagement with a nut pivotally provided at the acting end of the trigger. In this manner, the upper stem can be put into the receiving frame of the lower stem, and a pin is inserted through the positioning hole and the fixing hole so that the upper stem and the lower stem can be pivotally connected together. Further, a spindle inserted with a washer is inserted through the adjusting hole and the through hole, and then another washer is inserted thereon. A nut is in thread engagement with the spindle such that the upper stem, the lower stem and the trigger can be assembled into an adjusting structure of the dragon head. Then, the turn-up or pull-down action of the trigger is conducted such that the angle of the dragon head can be appropriately adjusted to be fixed in place.

In the practical use of the above dragon head adjusting structure, although the angle of the dragon head is adjusted and fixed in place by the turn-up or pull-down action of the trigger, user often forget to put the pin to fix the trigger. This will cause the easy sliding of the dragon head due to unfixing. In this case, it might be hazardous to user to cause safety problem.

SUMMARY OF THE INVENTION

In view of the above shortcomings, this invention provides a folding structure for carrier's handlebar, wherein the movability of the second joint is controlled by whether the occluding teeth on the bottom end of the slider mesh with the positioning teeth of the first joint or not. Thus, it is convenient for user to adjust the angle of the dragon head handlebar. In addition, an elastic member is provided on the top end of the slider such that the elastic member enables the slider to mesh automatically with the positioning teeth so as to ensure the safety of user.

In a preferred embodiment of the present invention, an folding structure for carrier's handlebar is provided, wherein it comprises a carrier body, a first joint fixed in the front end of the carrier body and having positioning teeth formed on the sidewall in the interior thereof, and a second joint pivotally provided in the first joint; a rail block being fixed in the interior of the second joint, the rail block being formed with a sliding rail, a slider being formed in the sliding rail, occluding teeth being formed on the bottom end of the slider to mesh with the positioning teeth of the first joint, a wire body and an elastic member being provided on the top end of the slider, and a dragon head handlebar being provided on the second joint.

According to a first preferred embodiment of the present invention, the first joint is provided with a through hole, a threaded fastening element penetrating through the through hole, while the second joint being provided with a threaded hole and a threaded fastening member being provided on the threaded hole for integrally fastening the threaded fastening element together.

According to a second preferred embodiment of the present invention, the positioning teeth mutually spaced at interval of 120° are formed along the sidewall of the first joint.

BRIEF DESCRIPTION OF THE DRAWINGS

The present invention will be better understood by the detailed description of the following preferred embodiment with reference to the accompanying drawings, in which.

DETAILED DESCRIPTION OF THE PREFERRED EMBODIMENT

The technical contents of the present invention will become more apparent from the detailed description of the preferred embodiment in conjunction with the accompanying drawings.

Figure 1:
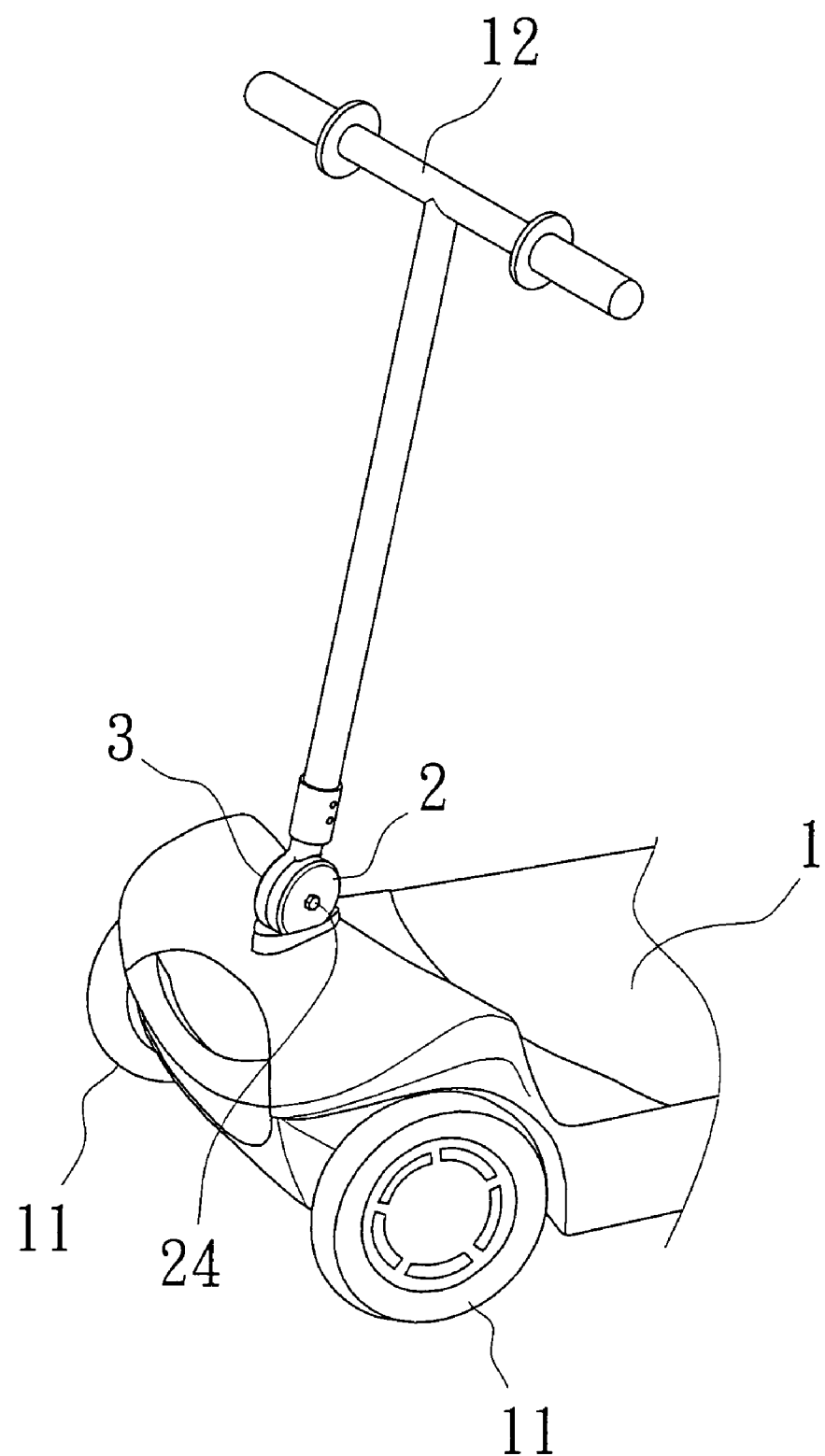
FIG. 1 is a perspective schematic view of the first embodiment of the present invention.
Figure 2:
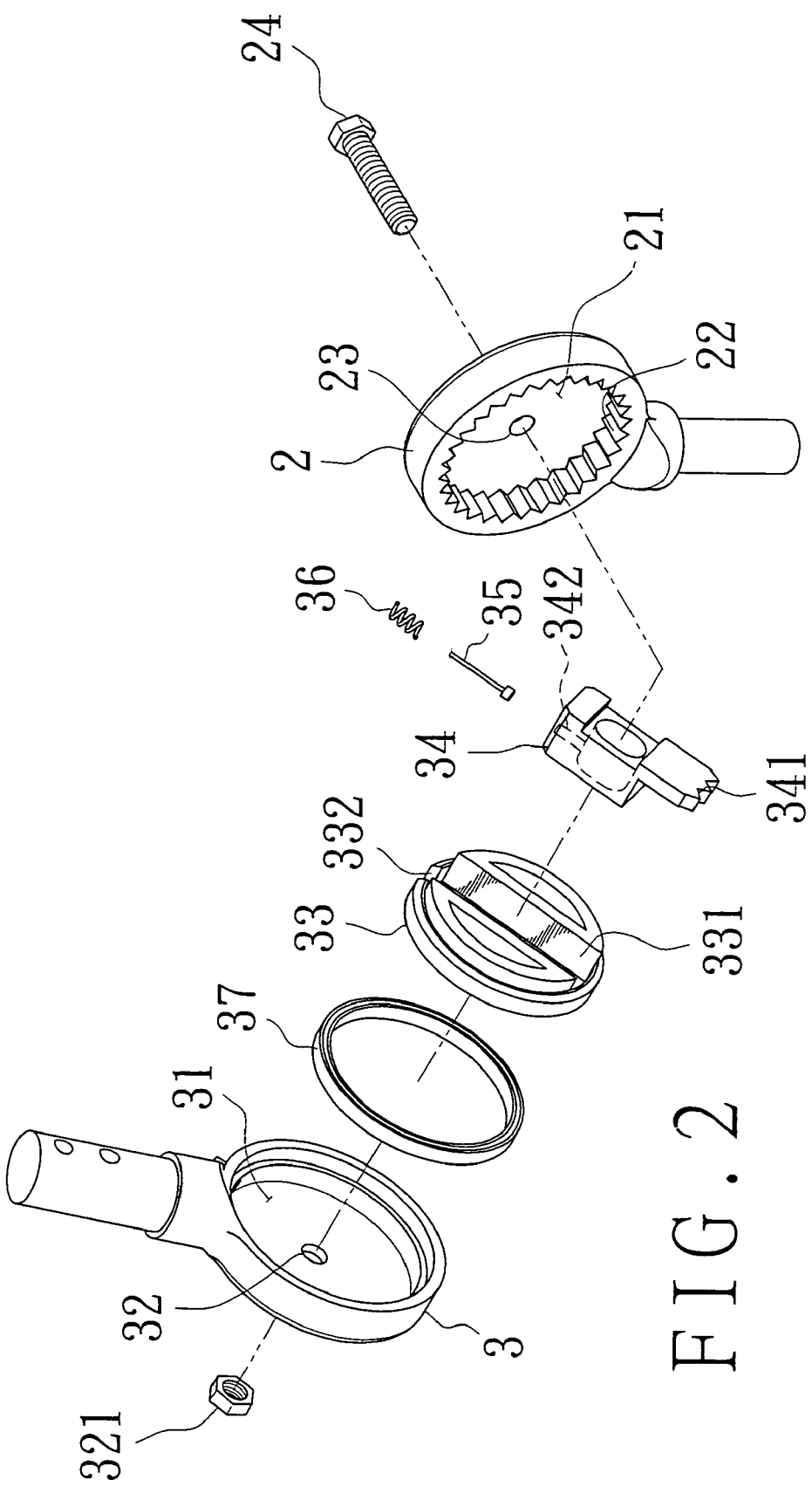
FIG. 2 is a perspective exploded view of the first embodiment of the present invention.

Firstly referring to FIG. 1 and 2, the folding structure for carrier's handlebar of the present invention comprises a carrier body (1), a first joint (2) and a second joint (3). In this folding structure for carrier's handlebar of the present invention, the carrier body (1) has a plurality of wheels (11) mounted on the bottom end and a driving device for driving the wheels (11). A dragon head handlebar (12) is provided on the front end of the carrier body (1) by which user can control the moving direction of the carrier body (1).

A cavity (21) is formed in the interior of the first joint (2). Positioning teeth (22) are formed along the sidewall of the cavity (21) to mesh with the occluding teeth (341) on the bottom end of the slider (34) such that the second joint (3) and the dragon head handlebar (12) can be fixed. Further, a through hole (23) is provided at the center of the cavity (21) through which a threaded fastening element (24) penetrates through the through hole (23) so as to fasten the first joint (2) and the second joint (3) integrally together.

A cavity (31) is formed in the interior of the second joint (3) and a threaded hole (32) is formed at the center of the cavity (31). A threaded fastening member (321) is provided in the threaded hole (32) for integrally fastening the threaded fastening element (24) of the first joint (2) together. A rail block (33) is fixed in the interior of the cavity (31), and a sliding rail (331) is formed in the center of the rail block (33). A slider (34) is provided in the sliding rail (34), and occluding teeth (341) are formed on the bottom end of the slider (34). A hole (342) is provided on the top end of the slider (34), and a movable wire body (35) is engaged therein. An elastic member (36) is inserted around the wire body (35) to provide elastic force required for the reciprocating motion of the slider (34). A notch (332) is formed on one end of the sliding rail (331) of the rail block (33) for the mounting of the wire body (35) and the elastic member (36). A pivoting device (37), such as a bearing, is combined on the outside of the rail block (33) in such manner that the rail block (33) is pivotally provided in the second joint (3) by the pivoting device (37).

Figure 3:
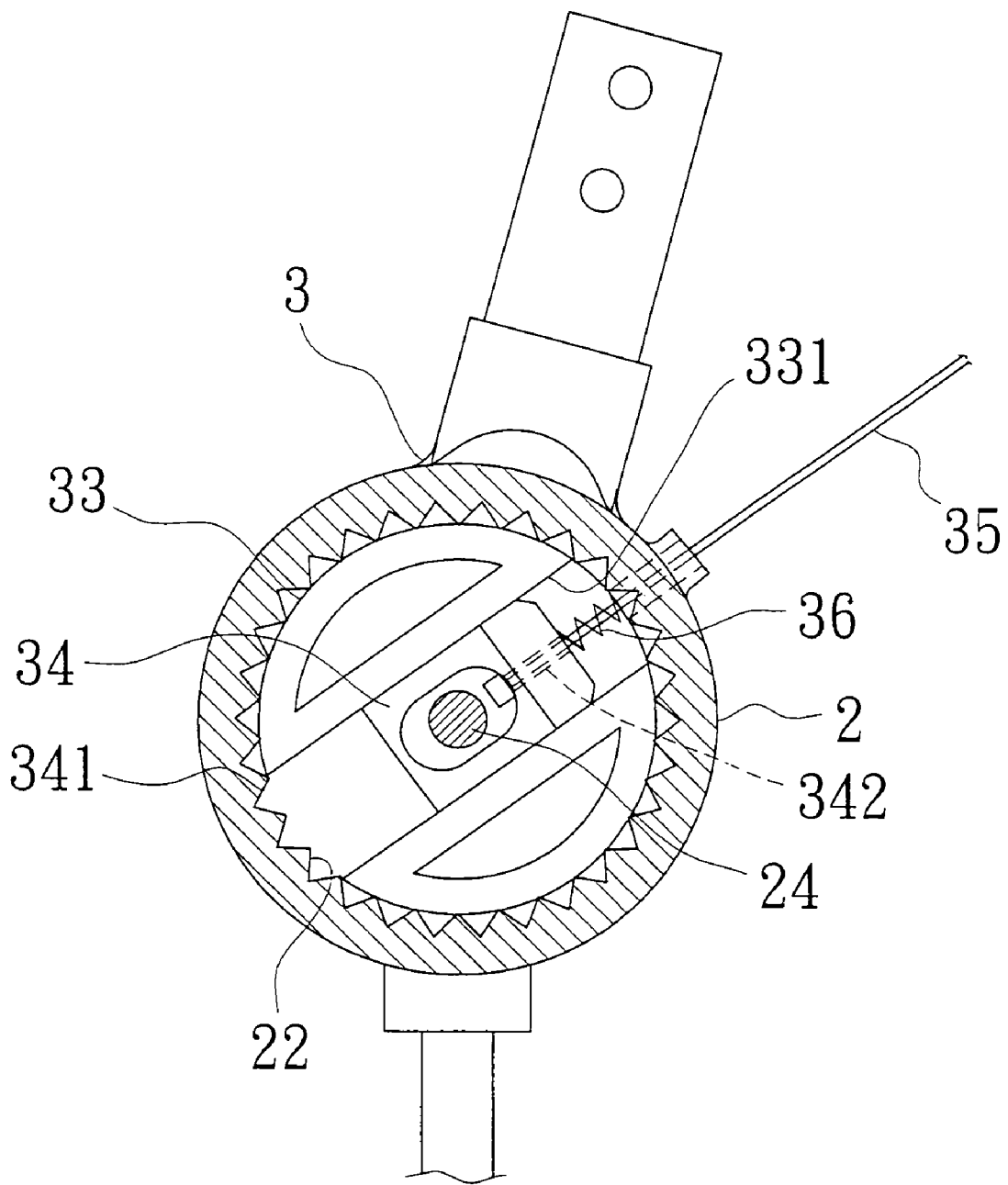
FIG. 3 is an assembling sectional view of the first embodiment of the present invention.
Figure 4:
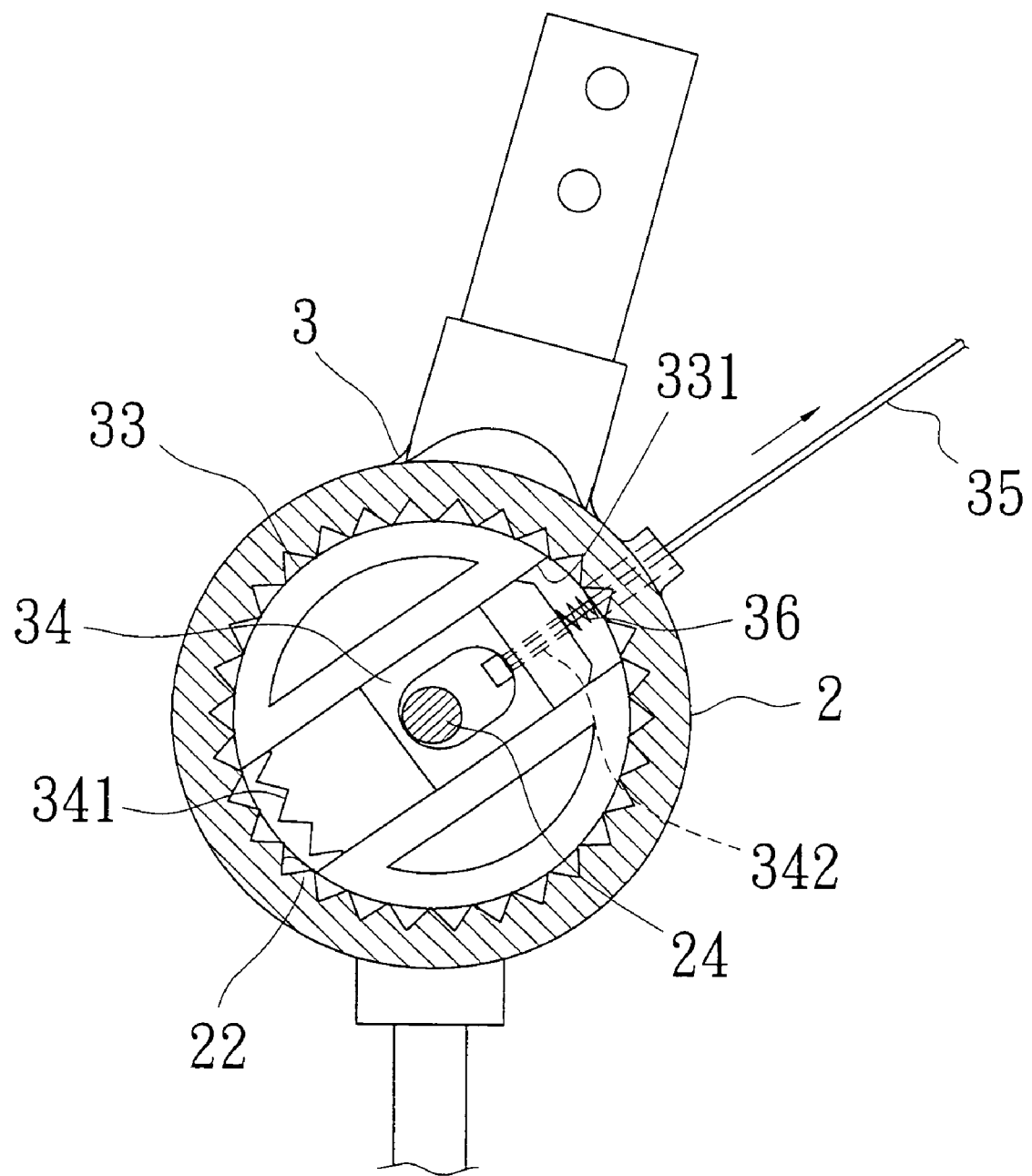
FIG. 4 is a view showing the moving state of the slider of the first embodiment of the present invention.
Figure 5:
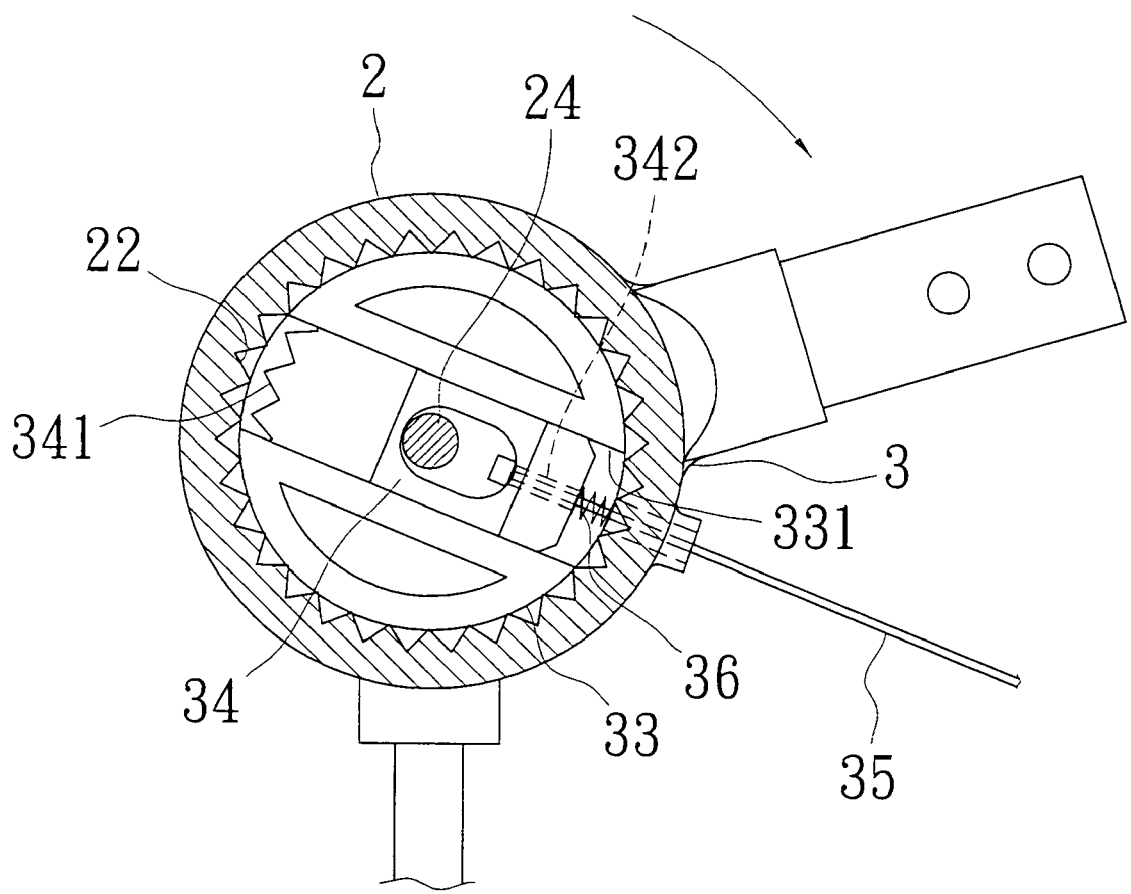
FIG. 5 is a view showing the rotating state of the second joint of the first embodiment of the present invention.
Figure 6:
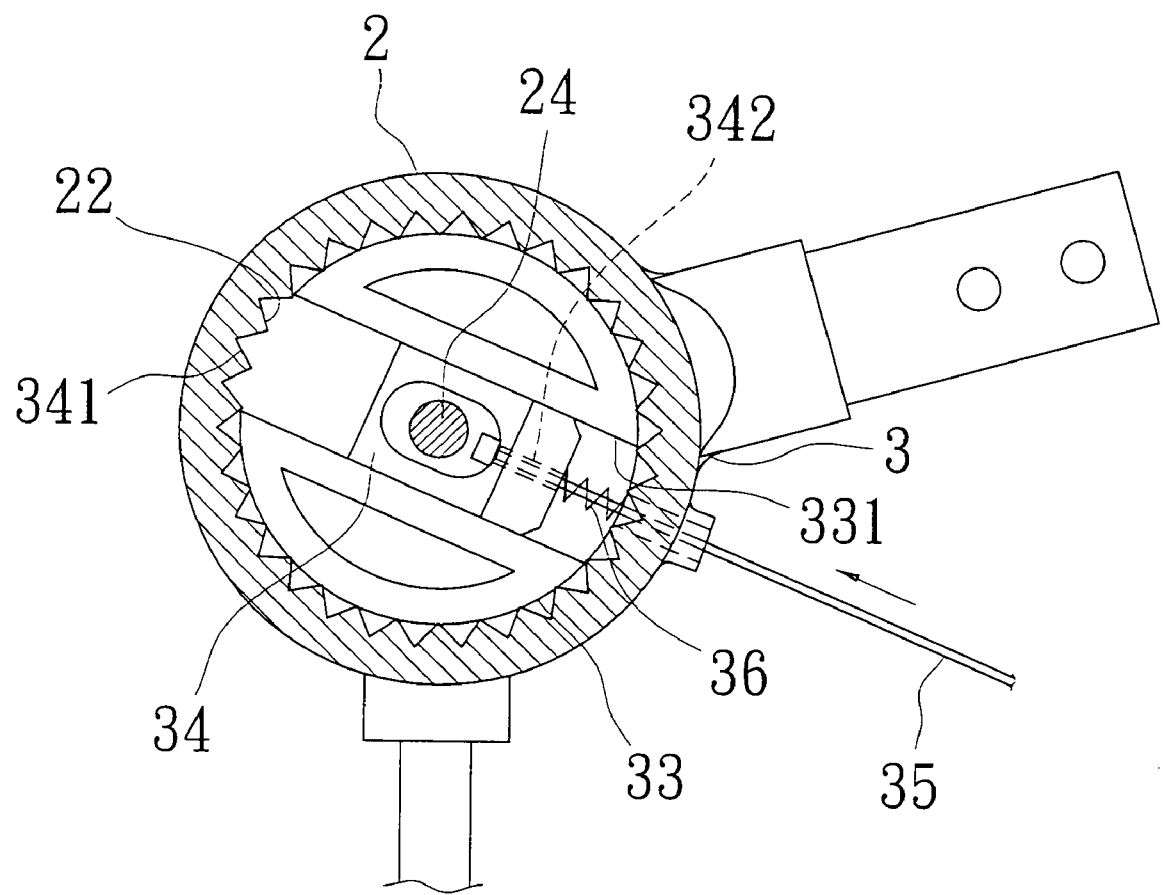
FIG. 6 is a view showing the positioning state of the slider of the first embodiment of the present invention.

When assembling is conducted, referring to FIG. 1 to 3, the first joint (2) is fixed on the front end of the carrier body (1), and the second joint (3) is mounted on the-bottom end of the dragon head handlebar (12). The cavity (31) of the second joint (3) is abutted oppositely with the cavity (21) of the first joint (2). The slider (34) of the second joint (3) is positioned in the cavity (21) of the first joint (2) such that it can slide along the sliding rail (331) in the center of the rail block (33), and the occluding teeth (341) on the bottom end of the slider (34) can mesh with the positioning teeth (22) of the first joint (2) so as to fix the second joint (3) onto the first joint (2). Thus, the angle of the dragon head handlebar (12) can be fixed on a certain value. Furthermore, the threaded fastening element (24) of the first joint (2) is penetrated through the threaded hole (32) of the second joint (3) such that the thread member (321) is in engagement with the threaded fastening element (24). Since the rail block (33) is pivotally provided in the second joint (3) by the pivoting device (37), the second joint (3) can be movably abutted with the first joint (2) so that user can adjust the angle of the dragon head handlebar (12).

When in use, referring to FIGS. 1 to 6, the wire body (35) of the second joint (3) is pulled to move so that the slider (34) is raised up along the sliding rail (331) at the center of the rail block (33) to compress the elastic member (36). At this moment, the occluding teeth (341) on the bottom end of the slider (34) are separated from the positioning teeth (22) such that the second joint (3) can rotate to move by the assistance of pivoting device (37). That is to say, the dragon head handlebar (12) can be adjusted to desired angle by the second joint (3). When the dragon head handlebar (12) is adjusted to desired angle, the wire body (35) of the second joint (3) is released such that the elastic force of the elastic member (36) acts on the slider (34). Then, the slider (34) moves down along the sliding rail (331) at the center of the rail block (33) such that the occluding teeth (341) on the bottom end of the slider (34) can mesh again with the positioning teeth (22) of the first joint (2). In this manner, the dragon head handlebar (12) can be fixed at this angle.

Figure 7:
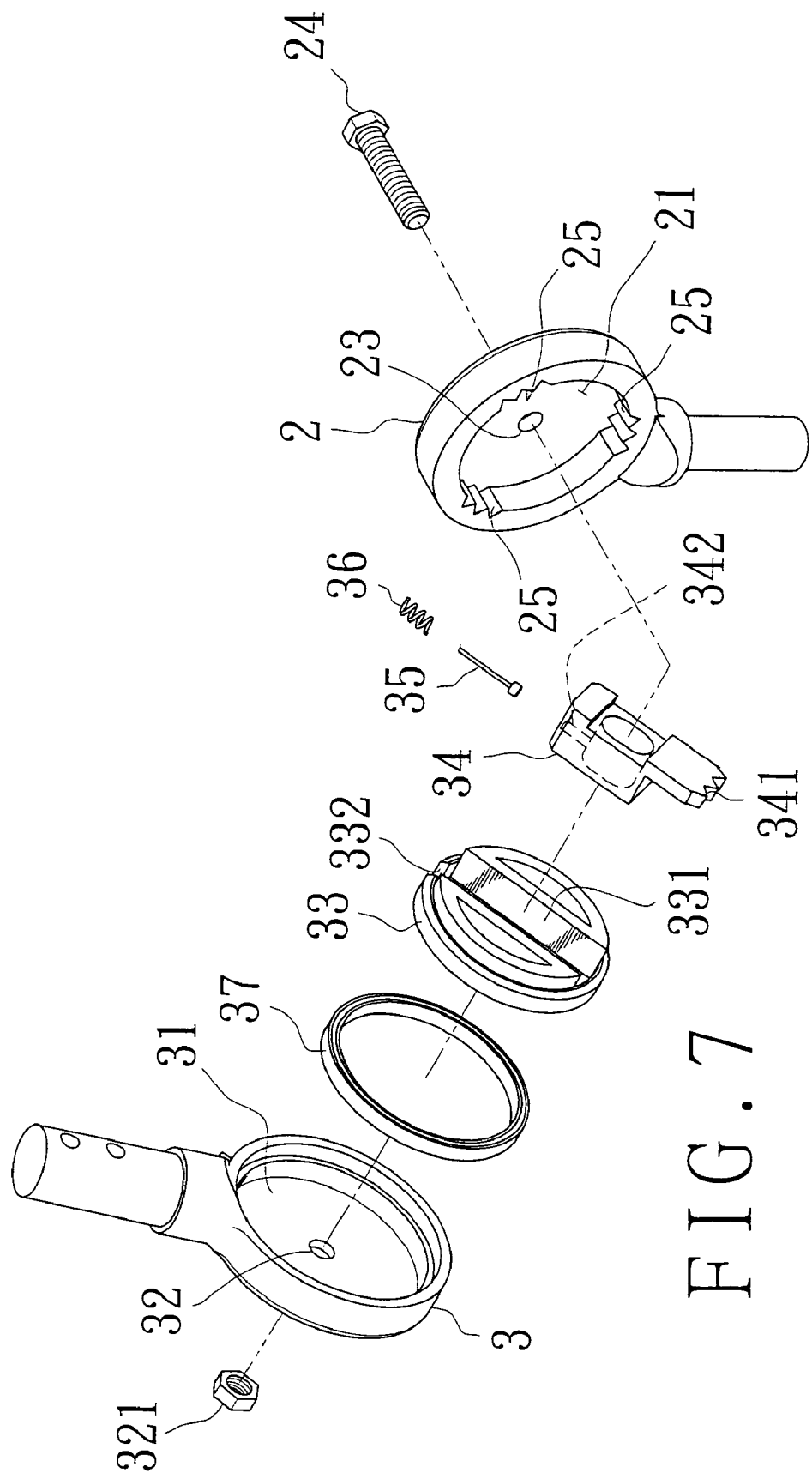
FIG. 7 is a perspective exploded view of the second embodiment of the present invention.
Figure 8:
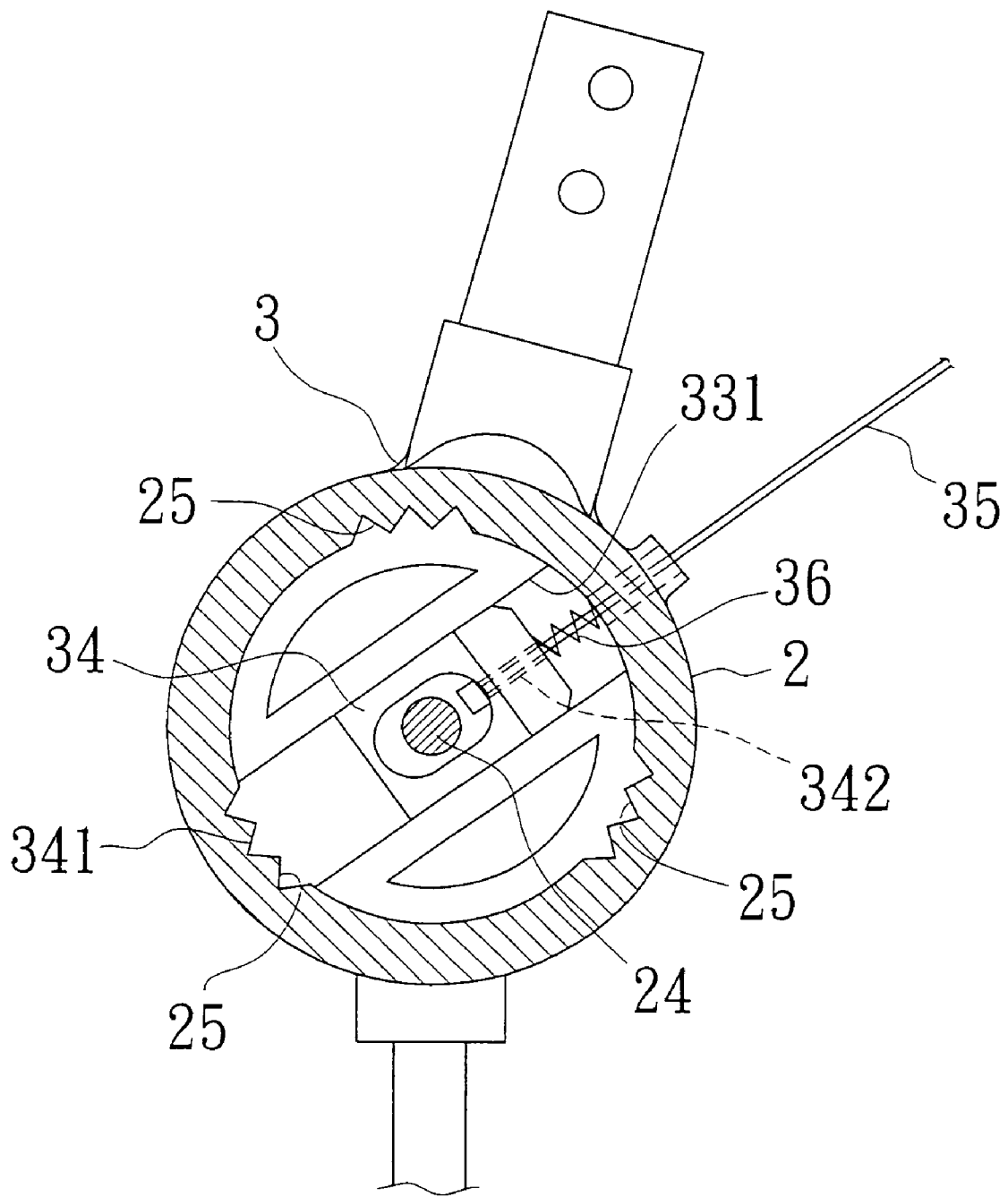
FIG. 8 is an assembling sectional view of the second embodiment of the present invention.

Referring to FIG. 1 and FIGS. 7, 8 showing a schematic view of the second embodiment of the folding structure for carrier's handlebar of the present invention, the second embodiment is different from the first embodiment in that three positioning teeth (25) mutually spaced at interval of 120° are formed on the sidewall of the cavity (21) of the first joint (2) for meshing with the occluding teeth (341) on the bottom end of the slider (34) so as to fix the second joint (3) and the dragon head handlebar (12). Therefore, the dragon head handlebar (12) in the second embodiment has three angle positions for adjustment. However, these embodiments or Figures are not mean to restrict the fixation method, pivoting structure or method of use of the present invention. Modifications and variations proposed by the person skilled in the art without departing from the spirit of the present invention are considered to be still within the scope of the present invention.

Based on the foregoing, this invention has the following advantages when comparing with prior art.

1. In the present invention, the movability of the second joint is controlled by whether the occluding teeth on the bottom end of the slider mesh with the positioning teeth of the first joint or not. Thus, it is easy for user to adjust the angle of the dragon head handlebar.
2. In the present invention, an elastic member is provided on the top end of the slider by which the occluding teeth on the bottom end of the slider mesh automatically with the positioning teeth of the first joint.

Thus, the safety of user can be guaranteed.

Summing up above, the embodiment of this invention can reach expected effectiveness, and the specific configurations disclosed herein have yet not seen in the prior art of the same category of product, even has not been opened to the public before application.

What is claimed is:

1. A folding structure for carrier's handlebar, comprising a carrier body (1), a first joint (2) fixed in a front end of said carrier body (1) and having a sidewall with a plurality positioning teeth (22) formed continuously around an interior circumferential surface of the sidewall, and a second joint (3) pivotally provided in said first joint (2); a rail block (33) being fixed in an interior of said second joint (3), said rail block (33) being formed with a sliding rail (331), a slider (34) being displaceably coupled to said sliding rail (331), occluding teeth (341) being formed on a bottom end of the slider (34) to mesh with a corresponding portion of said plurality of positioning teeth (22) of the first joint (2), a wire body (35) and an elastic member (36) being provided on a top end of said slider (34) with said wire body (35) passing axially through said elastic member (36), and a dragon head handlebar (12) being provided on said second joint (3); wherein said rail block (33) is provided with a pivoting device (37) which is pivotally provided in said second joint (3).

2. A folding structure for carrier's handlebar as claimed in claim 1, wherein said first joint (2) is provided with a through hole (23), said second joint (3) being provided with a threaded hole (32), and a threaded fastening member (321) being provided in aligned adjacency with the threaded hole (32), a threaded fastening element (24) being passed through said through hole (23) to engage the threaded hole (32) and the threaded fastening member (321).

3. A folding structure for carrier's handlebar as claimed in claim 1, wherein said pivoting device (37) is a bearing.

4. A folding structure for carrier's handlebar as claimed in claim 1, wherein a notch (332) is formed on one end of said sliding rail (331) of the rail block (33) and a hole (342) is provided on said slider (34) for the mounting of the wire body (35) and the elastic member (36).

5. A folding structure for carrier's handlebar, comprising a carrier body (1), a first joint (2) fixed in a front end of said carrier body (1) and having a sidewall with a plurality positioning teeth (22) formed continuously around an interior circumferential surface of the sidewall, and a second joint (3) pivotally provided in said first joint (2); a rail block (33) being fixed in an interior of said second joint (3), said rail block (33) being formed with a sliding rail (331), a slider (34) being displaceably coupled to said sliding rail (331), occluding teeth (341) being formed on a bottom end of the slider (34) to mesh with a corresponding portion of said plurality of positioning teeth (22) of the first joint (2), a wire body (35) and an elastic member (36) being provided on a top end of said slider (34) with said wire body (35) passing axially through said elastic member (36), and a dragon head handlebar (12) being provided on said second joint (3); wherein a notch (332) is formed on one end of said sliding rail (331) of the rail block (33) and a hole (342) is provided on said slider (34) for the mounting of the wire body (35) and the elastic member (36).

\* \* \* \* \*